Figure 1:
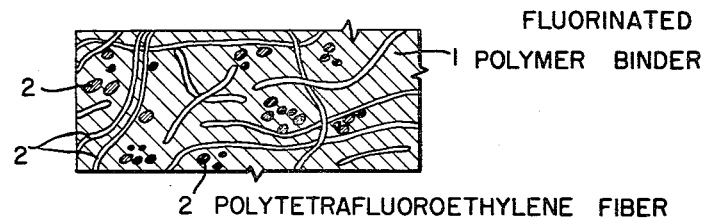

Dec. 11, 1956  E. A. RODMAN  2,773,781
COATED ARTICLE AND METHOD OF MAKING
Filed Sept. 24, 1954

INVENTOR
ERNEST A RODMAN

BY

AGENT

United States Patent Office 2,773,781
Patented Dec. 11, 1956

2,773,781

COATED ARTICLE AND METHOD OF MAKING

Ernest A. Rodman, Newburgh, N. Y., assignor to E. I. du Pont de Nemours and Company, Wilmington, Del., a corporation of Delaware Application September 24, 1954, Serial No. 458,288

8 Claims. (Cl. 117—138.8)

This invention relates to polytetrafluoroethylene fibrous structures and particularly to woven and non-woven polytetrafluoroethylene fiber fabrics impregnated with fluorinated polymers of ethylenically unsaturated compounds.

Polytetrafluoroethylene is a relatively new polymeric material which has several outstanding properties, such as insolubility in all commonly known volatile solvents, resistance to temperatures which will adversely affect almost all other known organic film-forming substances, resistance to abrasion, unusual electrical properties; e. g., high dielectric strength, high insulation resistance and extremely low power factor. It is also unusual in that it provides an anti-stick surface. Films have been prepared from the polytetrafluoroethylene to take advantage of many of the desirable properties of the material. The use of such films however is limited to those applications where high tensile and high tear strengths are not critical.

An object of this invention is the production of high strength fibrous sheets which are chemical and heat resistant. Other important objects will become readily apparent from the following description and claims.

The primary object of this invention is accomplished by forming a woven or non-woven sheet of polytetrafluoroethylene fibers or filaments, impregnating and/or coating the sheet with a homopolymer or copolymer comprising a fluorinated ethylenically unsaturated compound having one to three fluorine atoms on the ethylenic group and copolymers of tetrafluoroethylene and another ethylenically unsaturated compound having one to three fluorine atoms on the ethylene group and which is copolymerizable with the polytetrafluoroethylene. The homopolymer and copolymer impregnants and/or coatings are further characterized by having a coalescence temperature in the range of 20° F. to 250° F. lower than the polytetrafluoroethylene fibers, which corresponds to about 370° to 600° F. The properties of this impregnant and/or coating which are common to polytetrafluoroethylene include lubricity at high temperatures, insolubility in all commonly available solvents, high dielectric strength, resistance to adhesion to other surfaces, and resistance to degradation at temperatures which will decompose practically all other organic film-forming materials.

The homopolymers useful as the impregnant in carrying out this invention include the homopolymers of monochlorotrifluoroethylene, dichlorodifluoroethylene, trichloromonofluoroethylene, vinyl fluoride, vinylidene fluoride and 2-fluoro-1,3-butadiene.

The copolymers which may be used as the impregnant and/or coating include those which are derived from a monomer mixture comprising at least 50% of a monomer of a fluorinated ethylenically unsaturated compound having up to four fluorine atoms on the ethylene group. Such copolymers include the copolymers of monochlorotrifluoroethylene or tetrafluoroethylene copolymerized with monoethylenically unsaturated hydrocarbons, such as ethylene, propylene, isobutylene; halogenated alkylene compounds such as monochlorotrifluoroethylene, monochlorodifluoroethylene, monochloromonofluoroethylene, dichlorodifluoroethylene, dichloromonofluoroethylene, trichloromonofluoroethylene and hexafluoropropylene; vinyl halides, such as perfluoroacrylonitrile, vinyl chloride, vinyl fluoride and vinyl bromide; compounds having more than one ethylenic double bond such as butadiene, isoprene, 2-fluoro-1,3-butadiene, 2-chloro-1,3-butadiene and 2-cyano-1,3,butadiene. Tetrafluoroethylene or monochlorotrifluoroethylene can be copolymerized with one or more of the above polymerizable compounds to obtain 2-,3-, or multi-component coplymers which are also useful in carrying out this invention.

An important consideration is the selection of a homopolymer or copolymer impregnant or coating material which has a fusion or coalescence temperature of about 20–250° F. lower than polytetrafluoroethylene which permits the homopolymer or copolymer to be fused or coalesced in the presence of polytetrafluoroethylene fibers without destroying their fibrous character.

The copolymerization reaction is usually carried out in an aqueous medium and the copolymer remains dispersed in the aqueous medium with the aid of dispersing agents. It is also possible to carry out the copolymerization reaction in the presence of organic liquids instead of, or in addition to water. Examples of liquids of this kind are hexane, octane, iso-octane, cyclohexane, benzene, toluene, xylene, acetone, methanol, ethanol, isopropanol, butanol and tertiary amyl alcohol.

Figure 2:
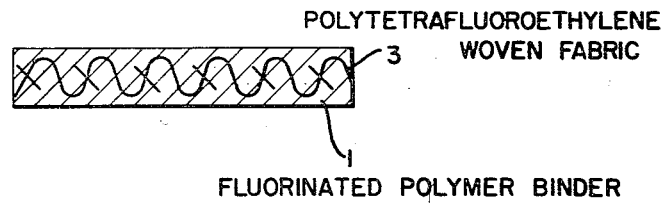

In the drawing Figure 1 is a greatly enlarged diagrammatical cross section of a non-woven web composed of polytetrafluoroethylene fibers 2 in a helter skelter arrangement in a matrix of fused fluorinated polymer binder 1. Figure 2 is a similar view showing a woven fabric 3, embedded in a matrix of fluorinated polymer binder 1.

The following specific examples illustrate the invention with respect to one specific homopolymer and one specific copolymer. It is to be understood however that a dispersion of any one of the homopolymers or copolymers disclosed above in a volatile liquid can be used in carrying out this invention. Care should be taken to heat the impregnated or coated fibrous mass up to at least the fusion or coalescence temperature of the homopolymer or copolymer but below the fusion temperature of polytetrafluoroethylene which is 621° F.

*Example I*

A non-woven batt of polytetrafluoroethylene fibers was prepared in accordance with the procedure described in Example 1 of copending application, Serial No. 436,014, filed June 11, 1954, by Herbert G. Lauterbach. The batt consisted of drawn retractable polytetrafluoroethylene filaments of 3 to 5 denier and cut into 3 inch staple. The retractable staple was run through a garnet to open it up. The staple was passed through the garnet a second time and collected as a loose batt weighing about 20.7 ounces per square yard and about one and one-half inches thick. The batt was passed through a needle loom to give it added strength for further processing.

The needle punched non-woven batt of polytetrafluoroethylene fibers was saturated with the following aqueous dispersion:

Parts by wt.

Copolymer of hexafluoropropylene (about 10 parts
  by weight) and tetrafluoroethylene (about 90
  parts by weight) _____ 7.0
Water _____ 92.3
Octyl phenyl polyglycol ether _____ .7

100.0

The saturated batt was dried at 300° F. until all the water was substantially removed. The dry impregnated batt was then subjected to light pressure (about 20 to 25 p. s. i.) and a temperature of 600° F. for one minute. The resultant sheet was tough, highly resistant to heat and corrosive chemicals. It had the appearance of leather in that the fibrous character of the polytetrafluoroethylene was not destroyed.

The final product had the following physical properties:

| | |
|---|---|
| Total weight oz./sq. yd. | 42.9 |
| Weight of polytetrafluoroethylene fibers oz./sq. yd. | 20.7 |
| Weight of copolymer binder oz./sq. yd. | 22.2 |
| Thickness mils | 28 |
| Tear strength (tongue method) lbs. | 40 |

The product of this example was ideally suited for gaskets and seals which require resistance to liquid fuels and high temperature. The impregnated felt had less cold flow than an unsupported film of polytetrafluoroethylene of equal thickness and resisted squeeze-out when used as a gasket or seal between two metal surfaces.

The copolymer of hexafluoropropylene and tetrafluoroethylene used in the above example may be prepared in accordance with the teaching set forth in U. S. Patent 2,549,935, which issued April 24, 1951, to John C. Sauer. The tetrafluoroethylene polymer from which the fibers were formed may be prepared in accordance with the disclosure in U. S. Patent 2,230,654, issued February 4, 1941, to R. J. Plunkett. The polytetrafluoroethylene filaments may be formed in accordance with the disclosure in U. S. Patents 2,559,750 issued July 10, 1951, to K. L. Berry and 2,685,707 issued August 10, 1954, to W. E. Llewellyn et al.

*Example II*

A two over one twill weave fabric, composed of yarns of polytetrafluoroethylene continuous filaments, weighing 8.0 ounces per square yard was dipped ten times into the aqueous dispersion composition of Example I. After each successive dip the excess composition was allowed to drain and dry at 300° F. The dry dip coated fabric was subjected to a light pressure treatment (20 to 25 p. s. i.) for a period of 60 seconds between metal plates heated to 600° F. There was approximately 30% shrinkage of the original area of the fabric after the fusion step.

The fabric was thoroughly impregnated and a continuous film of the copolymer was formed on each side of the fabric, the fabric yarns retaining their woven character.

The final product had the following physical properties:

| | |
|---|---|
| Total weight oz./sq. yd. | 14.2 |
| Weight of fabric oz./sq. yd. | 8.0 |
| Weight of coating oz./sq. yd. | 6.2 |
| Thickness mils | 13.0 |

The product was useful as a diaphragm in a fuel metering device for jet engines, where heat and hydrocarbon resistance are prime requisites.

*Example III*

A woven fabric of 1000 denier polytetrafluoroethylene fibers having a thread count of 28 threads per inch in both the direction of the warp and filler, weighing 9.7 ounces per square yard, was given two dip coats in the following composition:

| | Parts by wt. |
|---|---|
| Homopolymer of monochlorotrifluoroethylene | 44.0 |
| Xylene | 56.0 |
| | 100.0 |

The excess composition was allowed to drain from the fabric and dried at 300° F. after each successive dip. The fabric picked up 16.4 ounces of the polymer impregnant per square yard. The dried fabric was then pressed at 500° F. and 625 p. s. i. for three minutes.

The fibrous character of the polytetrafluoroethylene fabric was not destroyed by the heating and pressing of the impregnating fabric. The polytetrafluoroethylene fibers were embedded in the homopolymer of monochlorotrifluoroethylene. The final product was flexible and resistant to all known commonly available solvents and other corrosive chemicals, such as strong acids and alkalis. The final product was particularly useful as a diaphragm for fuel pumps for aromatic and/or aliphatic hydrocarbon fuels. It was also useful as a gasket for forming a seal between two metal surfaces.

Although the examples herein are limited to a copolymer of tetrafluoroethylene and hexafluoropropylene and a homopolymer of monochlorotrifluoroethylene, it will be understood that other copolymers and homopolymers of the types disclosed above may be substituted in whole or in part for the particular copolymer and homopolymer disclosed in the examples with satisfactory results, although it is to be distinctly understood that copolymers of tetrafluoroethylene and hexafluoropropylene and homopolymers of monochlorotrifluoroethylene are the preferred embodiments.

The copolymers of hexafluoropropylene and tetrafluoroethylene which contain from 5 to 50% hexafluoropropylene and 95 to 50% tetrafluoroethylene, based on the weight of the copolymer, are the preferred copolymers since they have essentially the same properties as polytetrafluoroethylene, except the fusion or coalescence temperature is sufficiently lower to be useful in carrying out this invention. The particularly preferred copolymers contain 5% to 15% hexafluoropropylene and 95% to 85% tetrafluoroethylene on a weight basis.

Throughout the specification and appended claims the term "filaments" includes both staple fibers and continuous filaments. The reference to woven structures embraces various types of weaves including braids.

In the appended claims the term "impregnated" includes the distribution of part of the impregnating polymer within at least part of the void space of the fibrous sheet along with some of said polymer on the surface of said sheet.

The sheet materials of this invention are useful for a variety of applications where high mechanical strength, resistance to high temperatures and resistance to corrosive chemicals are required. Such applications include electrical and heat insulation, protective clothing, belting, gaskets, fuel pump diaphragms, tank lining, and the like.

It is within the scope of this invention to subject superposed plies of a preformed film of the homopolymer or copolymer having a fusion temperature of about 370° F. to 600° F. and a layer of fibrous polytetrafluoroethylene to sufficient heat and pressure to cause the preformed film to fuse and penetrate into the fibrous layer.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

I claim:

1. A fibrous structure of polytetrafluoroethylene filaments impregnated with a copolymer of tetrafluoroethylene and hexafluoropropylene fused into a matrix.

2. The product of claim 1 in which the copolymer contains 95% to 85% tetrafluoroethylene and 5% to 15% hexafluoropropylene on a weight basis.

3. The product of claim 1 in which the fibrous structure is in the form of a woven fabric.

4. The product of claim 1 in which the fibrous structure is in the form of a non-woven fabric.

5. The process of preparing sheet material which comprises treating a fibrous sheet of polytetrafluoroethylene filaments with a dispersion of particles of a compolymer of tetrafluoroethylene and hexafluoropropylene in a volatile liquid, evaporating the liquid medium of the dispersions and heating between 370° F.–600° F. to fuse the copolymer particles to themselves and to the polytetrafluoroethylene filaments.

6. The process of claim 5 in which the polytetrafluoroethylene filaments are in the form of a woven fabric.

7. The process of claim 5 in which the polytetrafluoroethylene filaments are in the form of a non-woven fabric.

8. The process of claim 5 in which the volatile liquid is water.

References Cited in the file of this patent
UNITED STATES PATENTS

| | | |
|---|---|---|
| 2,448,952 | Berry | Sept. 7, 1948 |
| 2,581,454 | Sprung | Jan. 8, 1952 |
| 2,681,324 | Hochberg | June 15, 1954 |